United States Patent [19]
Gordon

[11] Patent Number: 5,357,905
[45] Date of Patent: Oct. 25, 1994

[54] EXERCISE APPARATUS FOR SMALL ANIMALS

[76] Inventor: Richard A. Gordon, 95 W. 3rd St., Freeport, N.Y. 11520

[21] Appl. No.: 58,569

[22] Filed: May 6, 1993

[51] Int. Cl.⁵ .............................................. A01K 15/02
[52] U.S. Cl. .................................... 119/708; 446/228
[58] Field of Search ............................. 119/29, 15, 17; 446/228, 229

[56] References Cited

U.S. PATENT DOCUMENTS

| | | | |
|---|---|---|---|
| 2,522,391 | 9/1950 | McGonigle | 119/17 |
| 2,620,588 | 12/1952 | Critser | 119/17 X |
| 3,315,640 | 4/1967 | Gamble | 119/29 |
| 3,791,346 | 2/1974 | Willinger et al. | 119/15 X |
| 5,031,573 | 7/1991 | DeMarco et al. | 119/15 |
| 5,133,290 | 7/1992 | DeMarco et al. | 119/15 |

Primary Examiner—Thomas Price
Attorney, Agent, or Firm—Bauer & Schaffer

[57] ABSTRACT

An apparatus for the exercise and relaxation of small animals having a tubular body which is open at each end for entering and exiting of the animal. The apparatus is suspended so that it hangs in a generally horizontal manner. The interior surface of the tubular body has a texture that provides the animal with sufficient traction to walk on, while the exterior surface is provided with a means that also facilitates the animal walking on it.

11 Claims, 1 Drawing Sheet

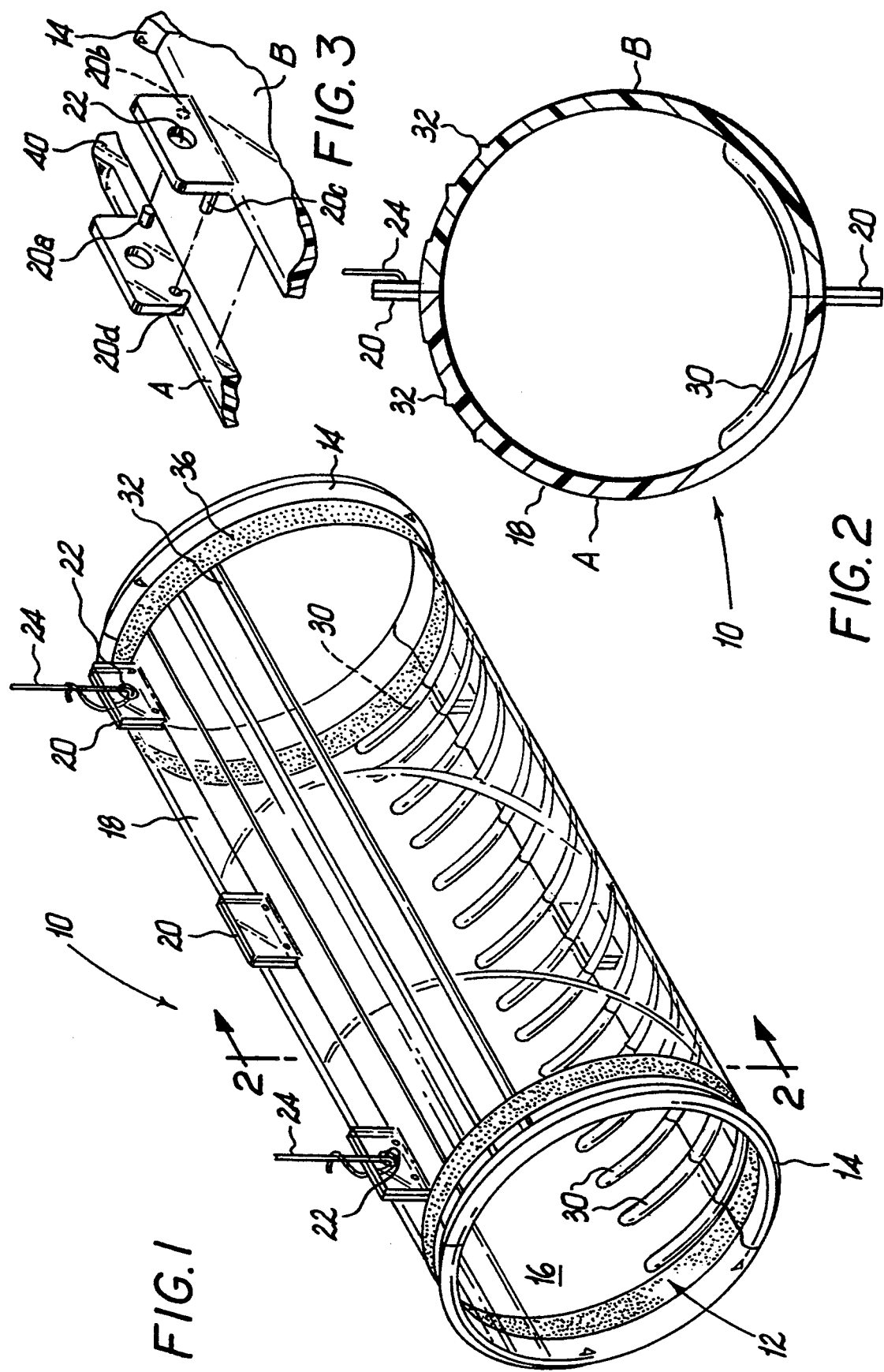

EXERCISE APPARATUS FOR SMALL ANIMALS

The present invention relates to apparatus for enabling a small caged animal to exercise, relax or play.

The adoption of small animals, such as ferrets, has become quite widespread, as such animals have many feline characteristics and are relatively intelligent, easily domesticated and quite cute and lovable as pets. Nonetheless, such animals must be closely supervised and generally confined to a cage lest they become a nuisance and a danger to themselves and other pets or even humans. While confined to the cage, the animal has only a limited area and facility to exercise and to play. This is a particular problem with ferrets as these animals are quite active and rarely remain still while awake.

On the other hand, the natural habitat of ferrets is such that they prefer small, confined holes or niches in which to sleep or relax. In general, household cages do not provide such burrow-like areas or conditions.

It is the object of the present invention to provide apparatus which combines the functions of a plaything, a gym, a relaxer and sleeping hole, for small animals such as ferrets.

The foregoing object, together with others and with the numerous advantages of the present invention, will be apparent from the following disclosure of the invention.

SUMMARY OF THE INVENTION

According to the present invention, the apparatus for the exercise and relaxation of small animals such as ferrets and the like comprises a tubular body open at each end for egress and ingress of the animal. The tubular body is suspended so as to hang in a generally horizontal direction. The interior surface of the body is provided with means providing the animal with sufficient traction while the exterior surface on top of the cylinder is provided with means facilitating the animal's walking thereon.

Full details of the present invention are set forth in the following description and shown in the accompanying drawings.

BRIEF DESCRIPTION OF THE DRAWINGS

FIG. 1 is an isometric-perspective view of the apparatus of the present invention;

FIG. 2 is a sectional view taken along line 2—2 of FIG. 1; and

FIG. 3 is an exploded partial view of the apparatus showing the edge and tab construction of the two parts from which it is formed.

DESCRIPTION OF THE INVENTION

As seen in FIG. 1, the apparatus of the present invention comprises a tubular body 10 of approximately 8 to 10 inches in length, although the size may vary dependent upon the size of the cage in which it is suspended. The body 10 is open at both ends 12 which are radiused to provide a smooth edge 14 except as described hereafter may have a smooth interior wall and smooth exterior wall 18. Extending from top of the exterior wall 18 are several tabs 20 at least two of which are located near respective ends of the body. A similar set of tabs are located to depend from the bottom of the exterior wall 18. The endmost tabs 20 are provided with holes 22 into which wire stringers 24 may be twisted and from which the body 10 may be suspended by twisting the wires at their upper ends to the cage.

While wire stringers are preferred, other suspension means may be employed such as fabric string, rigid brackets and even split ring brackets encircling the body. It will be obvious also that other means than the tabs may be used, e.g., holes may be fashioned in the body.

The tubular body 10 is preferably cylindrical although this is not critical and is formed with traction means along the bottom of the interior wall, preferably comprising a plurality of substantially parallel transverse ridges 30 located along the length of the body. The distance between the ridges 30 may vary, as desired, since the animal may easily stretch its legs to accommodate for the distance.

On the exterior surface 18 at the top of the body 10 there are provided a plurality of step-like platforms 32 extending along the length of the body. The platforms 32 are arranged relative to each other circumferentially and appear as steps, as seen in cross section of FIG. 2, further widening the circumference of the body. In this manner, the animal can climb onto the tubular body and find sufficient room for stability on the platforms 32.

The traction means for both the interior or exterior surfaces may be replaced or augmented with rubberized or foam sheet adhered to the surfaces or with other suitable means.

The tubular body 10 as seen in the figures is formed of two identical sections A and B. As seen in FIG. 3, each of the sections are finished with a smooth uniform edge 40 which can be mated and glued or heat sealed to be securely bonded. Each section is further formed with mating tab sections 20A and 20B which, when the body sections A and B are joined, abut and form the corresponding full tab. Each tab section is 20A and 20B is formed with a pin 20C and a hole 20D arranged and aligned so that when the tab sections are abutted together with the pin 20C of one fits into the hole 20D of the other, this locking the tabs together upon joining the tubular body halves it will also be preferred to glue or heat seal all of the tab sections 20A and 20B together.

It will be obvious, that the additional tabs 20, other than those for hanging the tab are desirable to insure the close connection and joining of the two halves of the tubular body. Additionally, a rubber band 36 may be placed over the exterior of the halves adjacent each end of the cylinder to ensure proper gluing and maintenance of the two pieces together during use.

Since each half section of the tubular body is identical with the other, manufacture and assembly of the complete body is easily accomplished.

In use, the apparatus is preferably suspended in the cage (or elsewhere) by attaching the free end of the wires 24 to the roof of the cage. In this manner, the tubular body 10 hangs downwardly substantially horizontal to the floor or bottom of the cage. Preferably, the tubular body should hang between 7 to 10 inches above the bottom of the cage and the open ends 12 far enough from the sides of the cage to provide the animal with free ingress and egress from the interior of the body. When used for ferrets, the diameter of the cage should be between 3 to 5 inches thus allowing two ferrets to enter the cage simultaneously. For other animals, the diameter of the body will be selected accordingly. When particularly used for ferrets, the ferrets are fascinated with the relatively small and enclosed tubular body not only exploring it, but using it as a sleeping or relaxing habitat. Animals, particularly ferrets, will explore the tubular body both inside and outside and will climb on its exterior as well as jump therefrom.

Various changes, modifications and the like have been suggested. Others will be obvious to those skilled in the art. Accordingly, it is intended that the foregoing disclosure be taken as illustrative only and not as limiting of the invention.

What is claimed is:

1. Apparatus for use by animals such as ferrets and the like comprising a tubular body having a wall open at each end and having interior and exterior surfaces, suspension means for hanging said body in a substantially horizontal position to permit ingress and egress for said animal through each end and traction means located on the interior surface of the Wall to enable said animal to maneuver within said body.

2. The apparatus according to claim 1 including traction means located on the exterior surface of said body in a position circumferentially opposite to said traction means on the interior surface.

3. The apparatus according to claim 1 wherein said traction means on the interior surface comprises a plurality of ridges extending perpendicularly to a longitudinal of said body and spaced from each other along the length of said body.

4. The apparatus according to claim 2 wherein said traction means on the exterior surface comprise a plurality of ridges extending parallel to the axis of said body along the length of said body and spaced circumferentially from each other.

5. The apparatus according to claim 1 wherein said suspension means comprises at least two tabs extending outwardly from the exterior surface of said body within the area in which said traction means are located, said tabs having holes for suspension means attachment thereto and to a remote support.

6. The apparatus according to claim 5 wherein said string means comprises a twistable wire.

7. The apparatus according to claim 5 wherein said cylindrical body is formed of two identical elongated sections, each having a semicircular cross section and mating longitudinal edges.

8. The apparatus according to claim 7 wherein said semicircular section is formed with traction means on the interior and exterior surfaces adjacent the respective edges.

9. Apparatus for use by animals such as ferrets and the like comprising a tubular body having a solid wall open at each end and having interior and exterior surfaces, suspension means for hanging said body in a substantially horizontal position to permit ingress and egress for said animal through each end and traction means located on the exterior surface of the wall to enable said animal to maneuver on the exterior surface of said body.

10. The apparatus according to claim 9 wherein said traction means on the exterior surface comprises a plurality of ridges extending parallel to the axis of said body along the length of said body and spaced circumferentially from each other.

11. The apparatus according to claim 9 wherein said suspension means comprises at least two tabs extending outwardly from the exterior surface of said body within the area in which said traction means are located, said tabs having holes for suspension means attachment thereto and to a remote support.

* * * * *